United States Patent [19]

Rothchild

[11] 4,150,494
[45] Apr. 24, 1979

[54] METHODS AND APPARATUS FOR RECOVERING SOLVENTS

[75] Inventor: Ronald D. Rothchild, South Orange, N.J.

[73] Assignee: Airco, Inc., Montvale, N.J.

[21] Appl. No.: 828,375

[22] Filed: Aug. 29, 1977

[51] Int. Cl.$^2$ .............................. F26B 3/04
[52] U.S. Cl. ........................... 34/28; 34/32; 34/35; 34/36; 34/77; 34/86; 34/242
[58] Field of Search ................... 34/77, 28, 26, 36, 86, 34/35, 242, 54, 32; 427/345; 68/5 E

[56] References Cited

U.S. PATENT DOCUMENTS

| | | | |
|---|---|---|---|
| 2,743,529 | 5/1956 | Hayes | 34/36 |
| 2,746,168 | 5/1956 | Rickabaugh | 34/75 |
| 3,351,451 | 11/1967 | Smith et al. | 34/242 |
| 3,798,787 | 3/1974 | Heen | 34/77 |
| 3,931,684 | 1/1976 | Turnbull et al. | 34/242 |

Primary Examiner—Benjamin R. Padgett
Assistant Examiner—J. L. Barr
Attorney, Agent, or Firm—David L. Rae; Larry R. Cassett; Edmund W. Bopp

[57] ABSTRACT

Methods and apparatus for recovering hydrocarbon solvents evaporated during the curing of solvent borne coatings in an oven include supplying an inert gas to the vicinity of the oven entrance and exit to substantially exclude oxygen therefrom while safely maintaining a solvent vapor partial pressure within the oven of at least 75% of the lower explosive limit of such vapor in air. The oven atmosphere is exhausted and passed to a condenser to enable recovery of at least 85% of the solvent vapor as a liquid. Preferably, condensation of the solvent vapor is effected by heat exchange with liquid nitrogen which is effective to vaporize the liquid nitrogen to produce nitrogen gas which may then be utilized to exclude oxygen from and to inert the oven.

28 Claims, 2 Drawing Figures

4,150,494

METHODS AND APPARATUS FOR RECOVERING SOLVENTS

BACKGROUND OF THE INVENTION

The present invention relates to methods and apparatus for recovering solvents and more particularly to methods and apparatus for economically and safely recovering such solvents with minimum energy requirements and capital costs.

The curing of solvent borne coatings applied to materials has been widely practiced for many years in different industries. Typically, materials bearing such coatings are passed through an oven at a temperature of approximately 300° F. and during the curing process, such solvents are evaporated. As such solvents are typically comprised of hydrocarbons such as hexane, octane, or methyl ethyl ketone, the evaporation thereof into an oven atmosphere has resulted in potentially explosive conditions. One technique for rendering ovens safe during such curing processes has been to sweep large volumes of air through the oven thereby maintaining the solvent vapor concentration therein well below (25% or less) the lower explosive limit (LEL) and consequently avoiding explosive conditions in such ovens. In the past, it has been common practice to simply exhaust the foregoing oven atmosphere to the ambient atmosphere. However, recent environmental regulations have required that solvent be largely eliminated from such exhaust and in practice, this has led to the use of exhaust incinerators. It has been found that such techniques for rendering curing ovens safe have consumed excessive quantities of energy due to the fact that extremely high air flows through the oven tend to remove heat therefrom and thus require substantially greater quantities of energy (heat) in order to maintain a predetermined temperature therein. In addition, as the oven atmosphere supplied to an incineration device is relatively dilute in solvent vapor, natural gas or other combustible materials are generally added to the exhaust in order to incinerate substantially all of such solvent vapors. Although the use of certain instrumentation has been effective in enabling slightly higher solvent vapor concentrations, yet still well below LEL levels and less than 50% of the LEL as described in Industrial Finishing, March 1977, Pg. 16–18, air dilution techniques are still relatively inefficient with respect to energy usage and do not result in the recovery of solvent for further use.

Another technique in which a degree of solvent recovery is effected is illustrated in U.S. Pat. No. 4,012,847. In this system, relatively high air flows are supplied to a curing oven and the atmosphere containing solvent vapor is withdrawn therefrom and passed to a chiller to remove a portion of such vapor by condensation. The chiller exhaust gas is supplied through a circulating system including an adsorber which in turn is effective to condense or separate out further quantities of such vapors with an air stream being circulated through the adsorber and subsequently returned to the curing oven. Although the technique described in this reference results in some degree of solvent recovery, this system suffers from the aforementioned disadvantages of excessive energy consumption.

In order to remedy one or more of the defects of the aforementioned air dilution type solvent recovery systems, it has been proposed to introduce an inert gas into an oven during curing operations. A system utilizing an "inert" gas is illustrated in U.S. Pat. No. 3,909,953 wherein an oven atmosphere containing solvent vapor is withdrawn and passed to an incinerator device which is supplied with air and natural gas for enabling incineration of such solvent vapor. The effluent of the incineration device which contains less than 5% oxygen is subsequently returned as an "inert" gas to the oven thereby supplying the heat requirements of the oven without use of any additional fuel. This system obviates the need for dilution air and enables solvent vapor concentrations above the lower explosive limit to be maintained in an oven as well as satisfying hydrocarbon emission standards by passing only relatively "clean" gases to atmosphere. However, such a system is nonetheless complex and costly due to the incineration equipment required and is relatively expensive to operate in that the solvent vapor is utilized as a fuel in the incineration device rather than being recovered for eventual reuse. This combustion of solvent vapor yields considerably more heat than is required to establish required oven curing temperatures. Consequently, a large portion, e.g. two-thirds, of the incinerator heat must be wasted or "dumped" to ambient atmosphere.

It is also known from U.S. Pat. No. 2,746,168 to supply an "inert" gas to a drier, to remove the drier atmosphere containing solvent vapors and to condense such vapors to enable recovery of solvent. However, this type of system relies upon the recirculation of inert gas which tends to reduce the partial pressure of solvent vapor in the drier and hence the efficiency of the condensation device and therefore solvent recovery. Furthermore, such a system also requires the recycled "inert" gas to be heated and, as this inert gas is specifically described as the combustion products of natural gas and air, substantial quantities of hydrocarbon materials are nonetheless required for such a recovery system. A similar solvent recovery system is described in U.S. Pat. No. 3,798,787 and although this reference alleges lower fuel, power and refrigeration costs by utilizing a dry carrier or diluent gas, a complex arrangement of mechanical baffles is required to provide entry and exit air locks.

Accordingly, the prior art exhibits a clear need for a hydrocarbon solvent recovery technique in which the consumption of fuel sources and environmentally undesirable emissions are minimized by means of relatively simple, conventional and inexpensive equipment.

OBJECTS

Accordingly, it is an object of the present invention to provide improved methods and apparatus for recovering solvent vapors evaporated during the curing of solvent borne coatings.

It is a further object of the present invention to provide improved methods and apparatus for recovering solvents with reduced oven fuel consumption during the curing of solvent borne coatings.

It is yet another object of the present invention to recover solvents while essentially eliminating pollution hazards without utilization of incineration equipment and the additional energy required thereby.

It is yet a further object of the present invention to provide methods and apparatus for recovering solvents while avoiding oven safety hazards, i.e. explosions.

It is still another object of the present invention to provide improved methods and apparatus for recovering solvents in liquid form in which the same medium utilized to condense solvent vapors is also utilized for excluding oxygen from and inerting the oven in which such vapor is generated.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, articles to which hydrocarbon solvent borne coatings have been applied are passed through a heated oven to evaporate such solvents and form a solvent vapor while curing such coatings, the improvement comprises recovering solvent vapors by supplying an inert gas flow to the vicinity of the oven entrance/exit ports to isolate the oven atmosphere from ambient and to maintain a solvent vapor partial pressure of at least 75% of the lower explosive limit thereof in air, withdrawing the oven atmosphere and passing said withdrawn atmosphere to a condenser to condense and recover at least 85% of said withdrawn solvent vapor. The partial pressure of solvent vapor in the curing oven atmosphere is preferably maintained at a level near or above the lower explosive limit of such vapor, namely, at least 6 mm. Hg and preferably between 80–400 mm. Hg thereby enabling at least 85% and preferably up to 99% or more of such solvent vapor to be condensed and recovered. The rate at which oven atmosphere is withdrawn is dependent upon the pressure within the curing oven and the inert gas flow to the vicinity of the oven entrance/exit ports is controlled to assure the exclusion of oxygen from the oven atmosphere.

Condensation of solvent vapors withdrawn from the curing oven may be effected in several manners, such as by heat exchange with air, chilled water, the liquid phase of the inert gas supplied to the oven or by mechanical refrigeration. Preferably, the refrigeration required for such condensation is supplied by passing the withdrawn solvent vapor stream in heat exchange with a substance such as liquid nitrogen to condense such solvent vapors and vaporize the liquid nitrogen so that the gas ($N_2$) phase thereof may be returned to the curing oven for the aforementioned inerting function. In the event a greater flow of such inert gas is required for oven inerting than is available from such vaporization, an additional supply of the liquid phase of the inert gas may be separately vaporized and supplied to the curing oven. Should the flow of inert gas required for oven inerting be less than is available from the vaporization of such liquid phase during the condensation of solvent vapors, excess inert gas may simply be vented to atmosphere. Thus, the method and apparatus according to the present invention enables the partial pressure of solvent vapor in an inerted curing oven to be controlled at a value about the vapor LEL while the refrigeration value of the liquid phase of such inert gas is utilized in condensing solvent vapors withdrawn from the curing oven.

BRIEF DESCRIPTION OF THE DRAWING

The invention will be more clearly understood by reference to the following description of exemplary embodiments thereof in conjunction with the following drawing in which.

DESCRIPTION OF PREFERRED EMBODIMENT

Figure 1:
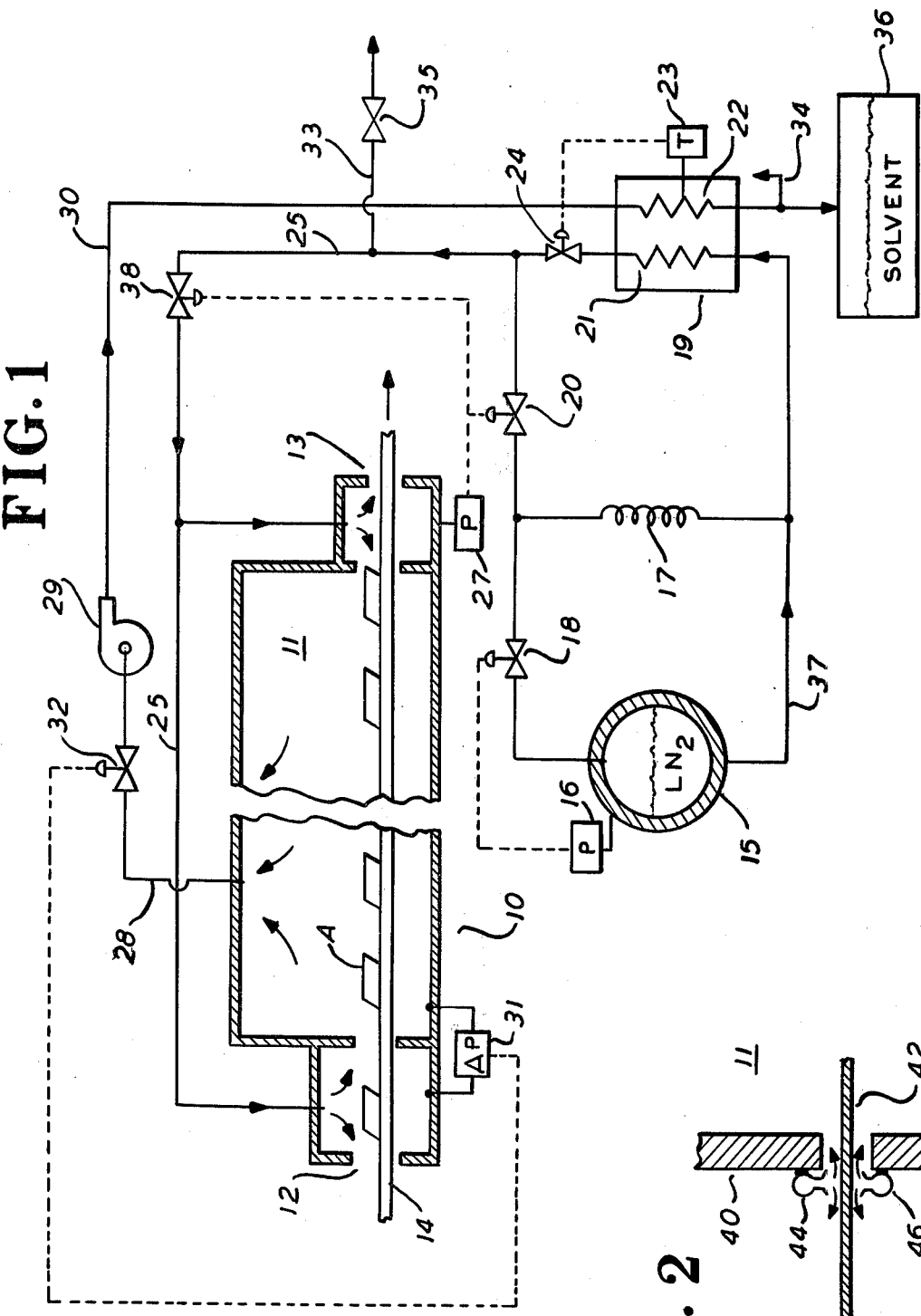
FIG. 1 is a diagrammatic view of an exemplary embodiment of apparatus for recovering solvent vapors in accordance with the present invention.

The methods for recovering solvent vapor in accordance with the present invention are premised upon the maintenance of solvent vapor partial pressures within a curing oven of at least 75% and preferably above the lower explosive limit (LEL) thereof in air and the efficient condensation of such vapors to recover solvent in liquid form suitable for reuse. The condenser exhaust gases eventually discharged to ambient atmosphere are essentially comprised of nitrogen and only minor quantities of non-condensed solvent vapors and consequently, even stringent air pollution requirements will be met. As will be subsequently apparent, the method according to the present invention may be practiced with relatively simple and inexpensive structure, which enables the recovery of at least 85% and preferably 99% or more of solvent vapors evaporated during curing operations and thereby avoids degradation of the environment while curing materials such as discrete articles or continuous products with less energy than has usually been required heretofore.

The energy savings derives from two factors. First, the need for incineration of solvent vapors, which increases energy consumption in prior art, is eliminated. Second, the inerted oven atmosphere is safely maintained with a much higher solvent vapor concentration than has been the case in prior art systems. Since the absolute amount of solvent vapor evaporated during curing is constant for any particular product and coating, the higher solvent vapor concentration of the present invention results in a smaller quantity of non-solvent gases being swept through the oven and therefore a smaller heating load.

For example, in prior art practice approximately 200 lb. air, necessary for safety, was swept through the oven, heated to typically 350° F. and discharged, for each 1 lb. of solvent vapor evaporated from the coating material. The energy requirements were approximately 300 Btu and 15,000 Btu to vaporize 1 lb solvent and to heat 200 lb. ventilation air, respectively, for a total energy requirement of approximately 15,300 Btu per lb. solvent evaporated.

In the present invention solvent vapor concentration in the oven may be maintained at, for example, 80 mm. Hg, in which case only 2 lb. nitrogen is swept through the oven and heated per 1 lb. solvent evaporated. Thus, in the present invention the oven energy requirements are approximately 300 Btu and 150 Btu to vaporize 1 lb. solvent and to heat 2 lb. nitrogen, respectively, for a total energy requirement of approximately 450 Btu per lb. solvent evaporated, which is only approximately 3% of the energy consumption of prior art methods. Thus the present invention, in addition to providing means for efficient solvent recovery, permits a reduction in oven fuel requirements of up to approximately 97% for curing of coatings on light substrates such as paper, etc. and approximately 60–70% for curing of coatings on other substrates such as steel.

The method of recovering solvents in accordance with the present invention utilizes conventional curing ovens well known to those skilled in the art which are preferably modified by the addition of inlet and exit vestibules or inert gas curtains. The requirement for a vestibule or merely a gas curtain will be controlled by the physical dimensions of the article to be cured. For example, in curing solvent borne coatings on a relatively continuous material such as sheet metal as in coil coating, the openings through which the sheet metal must pass to admit and remove it from the oven will be sufficiently small such that inert gas curtains at the oven entrance and exit will be sufficient to substantially preclude the entry of atmospheric oxygen into the oven and to simultaneously prevent the exit of solvent vapor from the oven, which is preferably purged prior to the commencement of curing. It will be appreciated that as solvent vapors evaporated during the curing process are combustible, it is necessary to assure that the oxygen concentrations of gases which may be mixed with such vapors are below a minimum level (e.g. 5%) necessary for combustibility. A value of under 5% oxygen should be maintained as an average throughout the over in order to be sure that there are no places (corners or leaks, for example) where oxygen might locally approach 12%, the ordinary minimum level required for combustibility. However, in the event that material such as discrete auto body parts are to have coatings thereon cured in such an oven, it is preferable to provide entrance and exit vestibules or chambers which receive a flow of inert gas and thereby preclude the entry of atmospheric oxygen into the curing oven. Such vestibules are necessary as the openings through which such larger parts will pass are sufficiently large so that inert gas curtains are generally ineffective to provide the required inerting functions and also because the shapes of such parts may tend to entrain atmospheric air into the oven.

The curing ovens are typically heated by conventional heating devices such as oil or natural gas burners to temperatures within the range of 200°–600° F. The rate at which coatings on articles will be cured in such ovens will generally depend on the oven temperature, the coating area, type and thickness. The rate at which such coatings are cured will also determine the rate at which solvents are evaporated therefrom and hence, the rate of solvent vapor formation in the oven. The particular solvents to be recovered by the method according to the present invention are generally derived from hydrocarbon feed stocks and may comprise octane, toluene, xylene, hexane, or methyl ethyl ketone, etc. The first two solvents mentioned are generally considered non-volatile due to the relatively high boiling points thereof while the latter two solvents are usually considered as volatile due to the lower boiling points of such substances. The importance of solvent volatility will be subsequently discussed in greater detail, although the volatility of any particular solvent will not prevent its recovery but rather will simply establish different operating conditions, such as during the condensation of particular solvent vapors removed from the curing oven.

As mentioned previously, the curing oven atmosphere established during the curing and solvent recovery process is essentially comprised of solvent vapor and inert gas as atmospheric oxygen has essentially been excluded from the oven itself. The partial pressure of the solvent vapors within the oven are near or above the lower explosive limit (LEL) of each particular type of solvent vapor in air (at least above 75% of the LEL) and are at least above 6 mm. Hg and preferably between 80–400 Hg. It is generally desired to maintain as high a solvent vapor partial pressure as possible, e.g. up to approximately 400 mm. Hg. The flow rate of inert gas supplied to the oven ports is controlled so as to maintain a slight positive pressure at the oven ports relative to both the oven interior and ambient such that the oven is effectively inerted and thus isolated from ambient atmosphere. The particular inert gas flow rate during the curing of any given type of article will depend upon the rate of solvent vaporization and the size of oven inlets and exits. For example, a total inert gas flow rate of less than 3 lb. of nitrogen per lb. of solvent vapor will generally enable an approximately 1:1 ratio of nitrogen/solvent vapor to be established in the oven.

The partial pressure of solvent vapor within the oven, which should be maintained as high as possible as will be subsequently discussed, is generally controlled by the rate at which solvent is evaporated during curing, the rate at which inert gas enters the oven, and the rate at which oven atmosphere is withdrawn. The greater the solvent vapor partial pressure within the curing oven, the less refrigeration will be required to condense a predetermined portion such as 85% or 90% etc. of the solvent vapors withdrawn from the oven. Thus, in order to condense a predetermined percentage by weight of a vapor, the partial pressure thereof must be reduced to a predetermined extent. However, as each partial pressure of a vapor corresponds to an equilibrium temperature, the higher the initial partial pressure, the higher is the final partial pressure and hence equilibrium temperature of non-condensed vapor, when a predetermined percentage of the vapor is condensed. Accordingly, a smaller temperature reduction is required in order to effect such desired degree of condensation. In other words, less refrigeration is required to recover by condensation a predetermined percentage of the initial vapor in an atmosphere.

The importance of the foregoing phenomenon is seen to reside in a greater degree of flexibility of the method according to the present invention in that alternative refrigeration sources may be utilized to effect condensation and recovery of different concentrations of particular solvent vapors. For example, by maintaining an oven atmosphere having a partial pressure of 400 mm. Hg of octane vapor, it will be possible to condense and hence recover 85% of such vapor by cooling this vapor to a temperature of approximately 150° F. The medium which may be utilized to effect such "refrigeration" may be either ambient atmosphere, chilled water, mechanical or "freon" type systems or the liquid phase of the inert gas. Conversely, the lower the partial pressure of solvent vapors in the withdrawn oven atmosphere, the lower must be the partial pressure of solvent vapors in the condenser exhaust in order to remove a predetermined portion of such vapors by condensation and consequently, the lower is the equilibrium temperature of the condenser exhaust gas. Thus, in this latter instance, lower temperatures must be obtained and a greater degree of refrigeration is required in order to recover a predetermined portion of the solvent vapors of the withdrawn oven atmosphere. In some cases, depending on the concentration and volatility of the solvent deep cold (under 0° F.) will be required.

In recovering solvents by the method according to the invention, it is preferred to utilize the refrigeration already available in the liquid phase of the inert gas to be supplied to the curing oven. Thus, it is preferred to pass liquid nitrogen, liquid argon, etc. in heat exchange with the withdrawn oven atmosphere to condense the solvent vapors therein and thereby enable solvent recovery while vaporizing liquid nitrogen or liquid argon etc. with the resulting gas phase being supplied in a controlled manner to the curing oven through vestibules or from inert gas curtains provided therewith. Accordingly, no additional refrigeration is required, nor energy costs incurred, to condense such vapors. However, in so utilizing liquid nitrogen or liquid argon, which is typically maintained at a temperature of −280° to −320° F., it is important to control the flow rate of such liquid to the condenser so as not to solidify or freeze out the solvent vapors to be condensed. Suitable temperature control devices may be utilized to avoid such undesirable solidification of withdrawn vapors and should the flow of inert gas resulting from the vaporization of a limited flow of the liquid phase thereof be insufficient to satisfactorily exclude oxygen from and inert the curing oven, an additional vaporizer may be utilized to ensure an adequate flow of inert gas to the curing oven to perform the foregoing functions. Furthermore, in the event that the flow of inert gas produced solely from vaporization of the liquid phase thereof upon heat exchange with the condensing solvent vapors is more than is necessary to inert the curing oven, a portion of the vaporized inert gas may be merely vented to atmosphere as the value of recovered solvents will generally exceed any cost of venting such excess inert gas.

As a substantial portion, such as 85% and preferably 99% or more of the solvent vapors of the withdrawn oven atmosphere are condensed, the condenser exhaust gas will consist of primarily inert gas (e.g. nitrogen) with only minor fractions of the solvent vapor. This condenser exhaust is preferably simply vented to atmosphere although the condenser exhaust gas could be returned to the oven atmosphere in the event it is desirable to limit the partial pressure of solvent vapor in the oven. Such a reduction in partial pressure would, however, increase the refrigeration requirements of the overall system. However, in accordance with the present invention it is preferred to vent to atmosphere or to other uses than the curing oven a major portion, if not all, of the condenser exhaust gas. This venting may include passing condenser exhaust gas in the vicinity of oven entrance/exit ports as part of a gas curtain with a portion of gas from such curtain entering the oven for inerting purposes. Alternately, if vestibules are utilized with the oven, condenser exhaust gas may be returned, with fresh inert gas, to such vestibules to improve the isolation of the oven atmosphere from the ambient atmosphere.

In order to enable a better understanding of the present invention, particular solvent vapors and the conditions under which such solvent vapors are condensed will now be set forth.

EXAMPLE 1—OCTANE

Solvents which are essentially comprised of octane (molecular weight equals 114) have a boiling point of 258° F. and with an octane partial pressure of 400 mm. mercury Hg in the oven atmosphere, octane comprises 82% by weight of such atmosphere. Listed below are exemplary percentages of octane to be condensed from such atmospheres and the partial pressures of octane in the condenser exhaust gas and temperatures required for corresponding values of condensed octane.

| Amount Condensed (%) | Part. Press. Octane In Condenser Exhaust Gas (mm. Hg) | Condensation Temperature (° F.) |
| --- | --- | --- |
| 85 | 109 | 152 |
| 99 | 8 | 60 |
| 99.8 | 1 | 7 |

EXAMPLE 2—HEXANE

Solvents comprised essentially of hexane (molecular weight equals 86) has a boiling point of approximately 155° F. Upon establishing a partial pressure of hexane of 400 mm. Hg in the curing oven (hexane=77% by weight of the atmosphere), the following conditions will exist with respect to the condensation of hexane vapors withdrawn from an oven containing such an atmosphere:

| Amount Condensed (%) | Part. Press. Octane in Condenser Exhaust Gas (mm. Hg) | Condensation Temperature (° F.) |
| --- | --- | --- |
| 85 | 109 | 66 |
| 99 | 8 | −21 |
| 99.8 | 1 | −65 |

From the foregoing Examples, it will be apparent that volatile solvent vapors such as hexane will require considerably greater refrigeration in order to recover a predetermined amount than will non-volatile solvent vapors such as octane. However, by utilizing the refrigeration available from the liquid phase of the inert gas supplied to the curing oven any particular type of solvent vapor may be effectively recovered and such recovery may be achieved by use of a system which will now be described.

Figure 2:
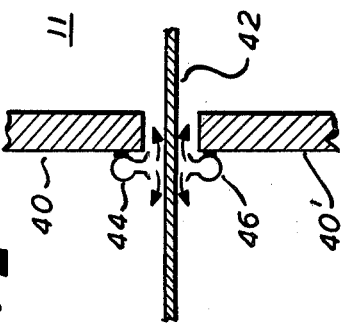
FIG. 2 is a partial elevational view of a gas curtain assembly suitable for use in connection with curing ovens.

With reference to FIG. 1, illustrated therein is an exemplary embodiment of apparatus for carrying out the method of solvent recovery according to the present invention. Apparatus 10 for curing coatings applied to articles A include a curing oven 11 which may be provided with inlet and outlet vestibules 12 and 13. Alternately, oven 11 may be merely provided with inert gas curtains as depicted in FIG. 2 at the entrance and exit thereof. Upon curing of coatings on relatively small and compact articles A vestibules 12 and 13 are preferred to enable sufficient isolation of oven 11 from ambient atmosphere. A conveyor 14 or other suitable translating means is provided for passing articles A serially through vestibule 12, oven 11 and vestibule 13. As mentioned previously, oven 11 is heated to a predetermined temperature of, for example, 200°-600° F., under which solvents of coatings applied to articles A are evaporated to form solvent vapors in oven 11.

Inert gas which may comprise nitrogen, argon, etc. is supplied through conduit 25 into vestibules 12 and 13. Preferably, the flow of inert gas into such vestibules is divided with a major portion of the flow to each vestibule being directed toward the entrance thereof while the remaining minor portion of such inert gas flow is directed toward and into curing oven 11. The pressure within vestibule 12 is preferably greater than the pressure within oven 11 and also greater than atmospheric pressure. In this manner, flow of inert gas is obtained from vestibule 12 both to the atmosphere and to oven 11, and the flow or diffusion of atmospheric oxygen through vestibule 12 or 13 into oven 11 will be essentially precluded. A differential pressure sensing device 31, which may take the form of a device well known to those skilled in the art is provided to detect the difference between pressures in vestibule 12 and oven 11 and to supply a signal to control valve 32 as will be subsequently described. A pressure sensing device 27 is arranged to detect the pressure within exit vestibule 13 and is coupled to adjustable valves 20 and 38. An exhaust conduit 28 is placed in communication with oven 11 and is coupled through valve 32 to a fan or blower 29, the outlet of which is connected through conduit 30 to a condenser 19 which may take the form of a known countercurrent heat exchange device having, for example, first and second passes 21 and 22. Thus, conduit 30 is preferably connected to pass 22 of condenser 19 with the outlet of pass 22 connected to vent line 34 and collection means 36 which is provided to recover condensed solvent vapors. Condenser exhaust gases which will comprise at least 65% nitrogen or other inert gas are preferably vented to atmosphere through vent line 34 or may be recaptured for other uses.

The refrigeration required to effect such condensation of solvent vapors is preferably supplied from the liquid phase of the inert gas, such as liquid nitrogen. Accordingly, a vessel 15 which is appropriately constructed to retain liquid nitrogen under pressures of up to approximately 100 p.s.i.g. and at temperatures as low as approximately −320° F. is adapted to supply liquid nitrogen through line 37 to pass 21 of condenser 19. Preferably, a vaporizing coil or other heat exchange means 17 is also connected to line 37 and subsequently through valve 20 to conduit 25. A pressure sensing device 16 is adapted to detect the gas pressure within the head space of vessel 15 and is effective to provide a control signal to adjustable valve 18. As those skilled in the art will appreciate, in order to maintain a predetermined pressure within vessel 15 upon removal of liquid nitrogen therefrom through conduit 37, a portion of the removed nitrogen is vaporized in coil 17 and returned through valve 18 to maintain a predetermined pressure within vessel 15. Accordingly, pressure sensing means 16, coil 17 and valve 18 can be considered to form a conventional pressure building circuit although coil 17 will be utilized to supply vaporized liquid nitrogen through valve 20 as will be subsequently described. Liquid nitrogen which is supplied to pass 21 of heat exchanger 19 is vaporized therein with nitrogen gas being supplied through valve 24 to conduit 25 and for eventual passage to vestibules 12 and 13 or for use in inert gas curtains as mentioned above. Line 33 is coupled to conduit 25 and is effective to vent through valve 35 excess inert gas in the event that vaporization of liquid nitrogen results in more nitrogen gas than is required to exclude oxygen from and to inert oven 11.

In order to avoid the solidification of solvent vapors supplied to pass 22 of condenser 19, a temperature sensing means 23 is adapted to sense the temperature in pass 22 and in the event that such temperature decreases to a predetermined extent below the boiling point of a particular solvent being recovered, sensor 23 provides a control signal to valve 24 closing such valve and thereby reducing the flow of liquid nitrogen and hence the refrigeration provided thereby. Consequently, the freezing or solidification of such solvent vapors in pass 22 of condenser 19 is precluded. The condensed solvent which preferably comprises at least 85% of the solvent vapors supplied to pass 22 will be recovered in collection means 36 and the condenser exhaust gas which is essentially comprised of nitrogen and a minor portion of the non-condensed solvent vapors (preferably 35% or less) is merely vented to atmosphere as such condenser exhaust gas will generally comply with environmental regulations. At least 50%, and preferably all, of such condenser exhaust gas is vented to atmosphere or captured for other uses as return thereof into oven 11 would tend to reduce the solvent vapor partial pressure therein and, as mentioned above, would increase the difficulty in condensing such solvent vapors. However, as mentioned heretofore, such venting of condenser exhaust gases may be effected by passing such gasses through vestibules 12 or 13 to ambient atmosphere or the use of such gases in inert gas curtains. However, in the event that it is desired to maintain a predetermined solvent vapor partial pressure in oven 11, e.g. below 400 mm. Hg, condenser exhaust gas may be returned to oven 11.

The operation of the exemplary embodiment of apparatus illustrated in FIG. 1 will now be described. Inert gas is supplied through conduit 25 and is introduced into vestibules 12 and 13. As mentioned previously the inert gas supplied to vestibules 12 and 13 acts as a barrier between the ambient atmosphere and oven 11 to ensure that the gas flows into oven 11 will be inert gas from the vestibules 12 and 13, thereby maintaining the oxygen concentration therein below levels (e.g. an average of 5%) at which combustion can be supported. The atmosphere within oven 11 is concurrently removed through conduit 28 and valve 32 by means of blower or fan 29. The pressure within vestibule 12 will be greater than the pressure within oven 11 to prevent outflow of oven atmosphere to vestibule 12, and should the difference between such pressures decrease, pressure sensing means 31 is effective to control valve 32 thereby opening such valve and thus reducing the pressure within oven 11. Similarly, in the event that the differential in pressure between vestibule 12 and oven 11 increases above a predetermined value, sensing means 31 is effective to provide a control signal to valve 32 thereby closing such valve and increasing the presure within oven 11. In this manner, desired pressure conditions in vestibule 12 and oven 11 are maintained such that ambient atmosphere is substantially excluded from both vestibule 12 and oven 11 and the pressure in vestibule 12 is maintained at a value sufficiently above the pressure in oven 11 so as to preclude any flow of solvent vapor from oven 11 into vestibule 12.

As mentioned previously, the rate at which the liquid phase of the inert gas is vaporized in condenser 19 may be insufficient to provide adequate flows of inert gas to maintain requisite pressures within vestibules 12 and 13 and within oven 11. In order to provide such additional inert gas, the liquid phase thereof may also be vaporized in coil 17 with the resulting inert gas produced thereby being passed through valve 20 and joining the flow of inert gas through pass 21 with the combined flow being supplied through conduit 25 as aforementioned. Control over the flow of inert gas through conduit 25 is achieved by means of pressure sensing device 27 detecting the pressure within vestibule 13 such that upon the pressure therein being detected as above a predetermined level, sensing device 27 produces a signal which is effective to close valve 20 and modulate valve 38 with the only flow of inert gas being supplied by the vaporization of the liquid phase thereof in pass 21 of condenser 19. Such detection of relatively high pressures in vestibule 13 will occur generally upon the curing of coatings applied to relatively small and compact articles. However, upon passage of large articles having complex shapes through oven 11 in order to cure coatings thereon, the inlet and exit openings of vestibules 12 and 13, respectively, will be considerably larger than during the curing of coatings on relatively compact, small articles. In the event that such greater inert gas flows are necessary to maintain a predetermined pressure, i.e. sensor 27 detects a pressure in vestibule 13 below a predetermined value, sensor 27 produces a control signal which is effective to open valve 20 and drive valve 38 to a fully open position thereby enabling a flow of inert gas generated by the vaporization of the liquid phase thereof in coil 17 through valve 20 for addition to the inert gas vaporized in pass 21 of condenser 19. In this manner, a greater than normally required inert gas flow to vestibules 12 and 13 may still be produced to assure that such vestibules and oven 11 are inerted. The withdrawn oven atmosphere in conduit 30 is condensed in pass 22 upon countercurrent heat exchange with liquid nitrogen in pass 21 of device 19. The condensed solvent is recovered in collection tank 36 and is available for reuse while a major portion of the condenser exhaust gas is preferably vented to atmosphere through line 34 or through vestibules 12 and 13 as mentioned heretofore.

An exemplary embodiment of apparatus for providing a gas curtain at an entrance (or exit) port of oven 11 is illustrated in FIG. 2. Oven walls 40 and 40' are disposed so as to form a passage therebetween for a material 42 which may comprise sheet metal bearing a coating to be cured. Preferably, walls 40 and 40' are disposed in relatively close proximity to material 42. Conduits 44 and 46, which may be affixed to the exterior surfaces of walls 40 and 40', respectively, are connected to a source of inert gas such as nitrogen. Conduits 44 and 46 are provided with a suitable aperture or orifice for emitting streams of inert gas toward material 42 and are directed to flow either into or away from oven 11.

In summary, the method according to the present invention enables the efficient recovery of solvents evaporated during the curing of solvent borne coatings by maintaining a solvent vapor concentration in the curing oven of at least 75% of and preferably above the lower explosive limit (LEL) of such vapors in air while removing the oven atmosphere, condensing the solvent vapors therein and recovering such condensed solvent. The foregoing method of solvent recovery does not require the use of complex and expensive incineration equipment nor the fuel necessary to burn such solvent vapors. Furthermore, by utilizing an inert gas to assure the maintenance of oxygen concentrations within the curing oven below levels necessary for combustibility, the need to continuously sweep large volumes of air or other gases through the curing oven to dilute solvent vapors therein is obviated. Accordingly, the curing oven may be maintained at a predetermined temperature with less fuel as the lower inert gas flow thereto results in the removal of less heat than has been heretofore occuring upon utilization of prior art air dilution techniques. Furthermore, by maintaining the aforementioned relatively high solvent vapor partial pressure of at least 6 mm. Hg and preferably between 80–400 mm. Hg in the curing oven, the ability to condense solvent vapors removed from the curing oven is facilitated and by utilizing the "free" refrigeration already available in the liquid phase of the inert gas supplied to the oven, additional refrigeration and the energy required therefore are avoided. Finally, due to the foregoing facilitation of condensation of solvent vapors, predetermined amounts of such vapors such as will comply with pollution control requirements, typically 85% and up to 99% or more, may be removed from the curing oven atmosphere which is supplied to the condenser and recovered as liquid solvents. Consequently, the condenser exhaust gas or the portion of the solvent vapor stream (withdrawn from the oven) which is not condensed will contain such minute vapor fractions that the condenser exhaust stream may be simply vented to atmosphere or, if desired, may be recirculated to the curing oven. Furthermore, such venting of condenser exhaust gas may include passage through oven vestibules or use in gas curtains to assist in precluding a flow of ambient atmosphere into the oven and a flow of oven atmosphere outwardly to ambient.

The foregoing and other various changes in form and details may be made without departing from the spirit and scope of the present invention. Consequently, it is intended that the appended claims be interpreted as including all such changes and modifications.

What is claimed is:

1. A method of recovering solvents evaporated during the curing of solvent borne coatings on material passed through a curing oven having an entrance and exit for passage of said material therethrough, the improvement comprising the steps of: supplying inert gas to said oven to (i) form an inert gas barrier at said entrance and exit and thereby substantially exclude atmospheric oxygen from said oven and (ii) inert said oven to safely maintain a solvent vapor concentration therein of at least 75% of the lower explosive limit of such vapor in air, withdrawing oven atmosphere and condensing at least 85% of the solvent vapors in said withdrawn atmosphere, recovering condensed solvent, and discharging a major portion of the non-condensed withdrawn atmosphere to the ambient.

2. The method defined in claim 1 wherein the solvent vapor partial pressure of said oven atmosphere is between approximately 6–400 mm. Hg.

3. The method as defined in claim 1 wherein the solvent vapor partial pressure in said oven atmosphere is between approximately 6–80 mm. Hg with a final solvent vapor partial pressure of 1 to 15 mm. Hg in the non-condensed withdrawn atmosphere.

4. The method as defined in claim 1 wherein said step of condensing solvent vapors includes passing said withdrawn atmosphere in heat exchange relation with a refrigerant selected from the class of air, water, freon, or the liquid phase of said inert gas.

5. The method as defined in claim 1 wherein the solvent vapor partial pressure of said oven atmosphere is between approximately 80–400 mm. Hg and the step of condensing solvent vapor includes condensing at least 99% of said solvent vapors by cooling the withdrawn oven atmosphere to a temperature at which the equilibrium partial pressure of said solvent is between approximately 1–9 mm. Hg.

6. The method defined in claim 1 wherein the solvent vapor partial pressure of said oven atmosphere is less than approximately 400 mm. Hg and the step of recovering said solvent includes condensing at least 85% of said solvent vapors by cooling the oven exhaust stream to a temperature at which the equilibrium partial pressure of said solvent is less than approximately 110 mm. Hg.

7. The method as defined in claim 1 wherein said step of forming said barrier comprises discharging said inert gas from a conduit external to the entrance and exit of said oven to act as a gas curtain to prevent the flow or diffusion of atmospheric oxygen into said oven.

8. The method as defined in claim 1 additionally comprising the step of regulating the solvent vapor partial pressure in the oven by controlling the flow rate of inert gas to said oven.

9. The method as defined in claim 1 wherein said oven is heated to a temperature in the range of between 250°–600° F. and wherein said solvent is selected from the class of octane, toluene, or xylene.

10. The method as defined in claim 9 wherein said step of condensing solvent vapor comprises chilling said withdrawn atmosphere to a temperature below approximately 150° F.

11. The method as defined in claim 9 wherein said step of condensing solvent vapor comprises chilling said withdrawn atmosphere to a temperature below approximately 60° F. to condense at least 99% of the solvent vapor in said withdrawn atmosphere.

12. The method as defined in claim 1 wherein said solvent vapor consists essentially of hexane and said oven is heated to a temperature in the range of 250°–600° F.

13. The method as defined in claim 12 wherein said step of condensing hexane vapor comprises chilling said withdrawn atmosphere to a temperature below 60° F.

14. The method as defined in claim 12 wherein said step of condensing hexane vapor comprises chilling said withdrawn atmosphere to a temperature below −20° F. to condense at least 99% of the hexane vapor in said withdrawn atmosphere.

15. The method defined in claim 12 wherein the solvent vapor partial pressure of said hexane is between approximately 6–80 mm. Hg and the step of condensing includes condensing approximately 85–99% of said hexane vapor by cooling the oven exhaust stream to a temperature at which the equilibrium partial pressure of said hexane vapor is between approximately 1–15 mm. Hg.

16. The method as defined in claim 1 wherein said oven entrance and exit comprise vestibules and additionally comprising the step of passing said material serially through said entrance vestibule, oven and exit vestibule, with the step of supplying said inert gas comprising supplying first and second inert gas streams to said entrance and exit vestibules, respectively, and directing a portion of each stream into said oven and directing the remaining portion of each stream outwardly of the corresponding vestibule to ambient atmosphere.

17. The method as defined in claim 16 wherein the flow rate of the combined first and second streams is less than three times as great as the rate at which solvent is evaporated in said oven.

18. The method as defined in claim 16 additionally comprising the step of maintaining the absolute pressures in said entrance and exit vestibules above the absolute pressure in said oven.

19. The method as defined in claim 17 additionally comprising the step of maintaining the absolute pressures in said entrance and exit vestibules above atmospheric pressure.

20. A method of recovering solvents evaporated during the curing of solvent borne coatings on material passed through a curing oven, the improvement comprising the steps of supplying inert gas to said oven to (i) substantially exclude atmospheric oxygen from said oven and (ii) to safely maintain a solvent vapor concentration therein above 75% of the lower explosive limit of such vapor in air, withdrawing oven atmosphere, passing said withdrawn atmosphere in heat exchange relation with the liquid phase of said inert gas to condense solvent vapors in said withdrawn atmosphere and thereby vaporize said liquid phase to form said inert gas for supply to said oven as set forth above, and recovering condensed solvent.

21. The method as defined in claim 20 further comprising the steps of sensing the temperature of said withdrawn atmosphere during the condensation of solvent vapors therefrom and controlling the flow of said liquid phase to preclude the temperature of said withdrawn atmosphere decreasing below the temperature at which said solvent vapor in the withdrawn atmosphere solidifies.

22. The method as defined in claim 20 wherein said oven is provided with entrance and exit vestibules and additionally comprising the steps of sensing the pressure in said vestibules, introducing said inert gas formed by condensation of said solvent vapors into said vestibules and introducing additional inert gas into said vestibules upon said pressure in said vestibules decreasing below a predetermined value.

23. The method as defined in claim 20 wherein said step of passing withdrawn atmosphere in heat exchange relation with the liquid phase of said inert gas comprises condensing at least 85% of the solvent vapor in said withdrawn atmosphere.

24. The method as defined in claim 20 additionally comprising the step of discharging a major portion of the non-condensed withdrawn atmosphere to ambient atmosphere.

25. Apparatus for recovering solvents evaporated during the curing of solvent borne coatings on material passed through a curing oven, the improvement comprising means for supplying inert gas to said oven to (i) substantially exclude atmospheric oxygen from said oven and (ii) to safely maintain a solvent vapor concentration therein above 75% of the lower explosive limit of such vapor in air, means for withdrawing oven atmosphere, means for passing said withdrawn atmosphere in heat exchange relation with the liquid phase of said inert gas to condense solvent vapors in said withdrawn atmosphere and thereby vaporize said liquid phase to form said inert gas for supply to said oven as set forth above, and means for recovering condensed solvent.

26. Apparatus as defined in claim 25 further comprising the means for sensing the temperature of said withdrawn atmosphere during the condensation of solvent vapors therefrom and means for controlling the flow of said liquid phase to prevent the temperature of said withdrawn atmosphere decreasing below the temperature at which said solvent vapor in the withdrawn atmosphere solidifies.

27. Apparatus as defined in claim 25 wherein said oven is provided with entrance and exit ports and corresponding entrance and exit vestibules disposed externally to said entrance and exit ports, means for sensing the pressure in said vestibules, means for introducing said inert gas vaporized from said liquid phase into said vestibules and means for adding a further flow of inert gas to said inert gas vaporized from said liquid phase upon said pressure in said vestibules decreasing below a predetermined value.

28. A method of reducing the fuel consumption of ovens used in the curing of solvent borne coatings on material passed through said ovens, the improvement comprising the steps of supplying inert gas to said oven to (i) substantially exclude atmospheric oxygen from said oven and (ii) to safely maintain a solvent vapor concentration therein above 75% of the lower explosive limit of such vapor in air, withdrawing oven atmosphere, passing said withdrawn atmosphere in heat exchange relation with the liquid phase of said inert gas to vaporize said liquid phase to form said inert gas for supply to said oven as set forth above to enable said high vapor concentration, low oven atmosphere ventilation rates, and reduction in energy consumption during said curing of solvent borne coatings.

* * * * *